United States Patent
Young

(10) Patent No.: US 9,421,619 B2
(45) Date of Patent: Aug. 23, 2016

(54) DRILL HOLE REPOSITIONING TOOL

(71) Applicant: Brian Young, Chelsea (CA)

(72) Inventor: Brian Young, Chelsea (CA)

( * ) Notice: Subject to any disclaimer, the term of this patent is extended or adjusted under 35 U.S.C. 154(b) by 143 days.

(21) Appl. No.: 14/523,917

(22) Filed: Oct. 26, 2014

(65) Prior Publication Data

US 2015/0174669 A1    Jun. 25, 2015

Related U.S. Application Data

(60) Provisional application No. 61/918,691, filed on Dec. 20, 2013.

(51) Int. Cl.
| | | |
|---|---|---|
| *B23B 49/02* | (2006.01) | |
| *B23Q 17/22* | (2006.01) | |
| *B23P 6/00* | (2006.01) | |

(52) U.S. Cl.
CPC ............. *B23B 49/02* (2013.01); *B23B 2247/08* (2013.01); *B23P 6/00* (2013.01); *B23Q 17/2266* (2013.01)

(58) Field of Classification Search
CPC .... B23B 49/00; B23B 49/02; B23B 2247/02; B23B 2247/08; B23B 2247/12; B23B 2270/34; B23Q 17/22; B23Q 17/2233; B23Q 17/2266; G01B 5/14; G01B 5/143
USPC .................... 33/638; 408/72 B, 241 B, 241 G
See application file for complete search history.

(56) References Cited

U.S. PATENT DOCUMENTS

| | | | | | |
|---|---|---|---|---|---|
| 1,160,752 | A | * | 11/1915 | Pfleiderer ............... | G01B 5/143 33/520 |
| 1,758,235 | A | * | 5/1930 | Nash ........................ | B23B 47/28 29/557 |
| 2,674,906 | A | * | 4/1954 | Timpner ................. | B23B 35/00 408/112 |
| 2,811,878 | A | * | 11/1957 | Morgan, Jr. ............. | B23B 47/28 408/115 R |
| 3,046,670 | A | * | 7/1962 | Wydra ..................... | G01B 3/14 33/555.1 |
| 3,064,504 | A | * | 11/1962 | Jarboe ................. | B23B 51/0054 33/638 |
| 3,804,546 | A | * | 4/1974 | Boyajian ................. | B23B 49/02 408/115 R |
| 4,941,781 | A | * | 7/1990 | Becher .................... | B23B 47/28 408/241 B |
| 5,574,381 | A | * | 11/1996 | Andermo .................. | G01B 7/02 324/660 |
| 5,973,494 | A | * | 10/1999 | Masreliez ............ | G01D 5/2046 324/207.17 |
| 6,279,244 | B1 | * | 8/2001 | Kelley ...................... | A44C 9/02 33/512 |
| RE37,490 | E | * | 1/2002 | Andermo ............. | G01D 5/2086 324/207.24 |
| 8,973,281 | B1 | * | 3/2015 | Fiquette ................. | G01B 3/002 33/501.45 |
| 2003/0047009 | A1 | * | 3/2003 | Webb ..................... | G01B 3/205 33/784 |
| 2016/0084627 | A1 | * | 3/2016 | Reble ................... | G01B 5/0028 33/609 |

FOREIGN PATENT DOCUMENTS

| | | | | | |
|---|---|---|---|---|---|
| GB | | 599681 A | * | 3/1948 | ............. G01B 5/143 |
| JP | | 01121113 A | * | 5/1989 | ............. B23B 49/00 |

* cited by examiner

*Primary Examiner* — Richard A Smith

(74) *Attorney, Agent, or Firm* — Peter Kwa; Ottawa Patent Agency Incorporated

(57) ABSTRACT

A drill hole repositioning tool has a handle or head for holding the tool, and an elongate drill bit guide having a crescent-like cross-section. The elongate drill bit guide is inserted in an existing drill hole with the convex side of the elongate drill bit guide butting on a side of the existing drill hole. The concave side of the drill bit guide guides a drill bit for drilling a new drill hole. The new drill hole is displaced from the existing drill hole by the thickness of the elongate drill bit guide. A set of drill hole repositioning tools may have a range of thicknesses of the drill bit guides to cater for a range of drill hole repositioning displacements, a range of diameters to cater for a range of standardized drill bit sizes, and a range of insertion lengths to cater for a range of drill hole depths.

13 Claims, 3 Drawing Sheets

DRILL HOLE REPOSITIONING TOOL

This application claims the benefit of U.S. Provisional Application No. 61/918,691 filed Dec. 20, 2013.

FIELD OF THE INVENTION

The present invention relates to hand tools, especially to hand tools for facilitating slight repositionings of drill holes.

BACKGROUND OF THE INVENTION

Drilling a hole in a workpiece incurs a drill force urging the drill bit to wander which may cause the drill hole to be slightly misplaced from its intended position. The misplacement may need the drill hole to be repositioned so as to align it to another drill hole in another workpiece.

SUMMARY OF THE INVENTION

The present invention provides a solution for repositioning slightly misplaced drill holes.

According to the invention, there is provided a drill hole repositioning tool for facilitating a repositioning of an existing drill hole in a workpiece. The drill hole repositioning tool has:
 a handle member for holding the tool; and
 an elongate drill bit guide secured to the handle member.
  The elongate drill bit guide has a shape which is substantially the shape of a sector of a cylindrical wall. The elongate drill bit guide has thus a convex side and a concave side. The convex side and the concave side each has an identical predetermined diameter D so that the cross-section of the elongate drill bit guide has a crescent-like shape. The elongate drill bit guide has a predetermined thickness T at the center of the crescent-like shape.
  The elongate drill bit guide has a predetermined insertion length L for inserting into the existing drill hole wherein the convex side of the elongate drill bit guide butts on one side of the existing drill hole.
  The concave side of the elongate drill bit guide is for guiding a drill bit. The drill bit is for drilling a new drill hole in the workpiece so that the new drill hole is displaced from the existing drill hole by the predetermined thickness T; whereby the cross-section of the overall resulting hole in the workpiece has a figure-eight-like shape wherein the existing drill hole has been repositioned to the new drill hole from one part of the figure-eight-like shape to the other part of the figure-eight-like shape.

The overall resulting hole in the workpiece may be shimmed with a shim glued on the one side of the existing drill hole with a pressure-sensitive adhesive. The convex side of the drill bit guide may be used for applying pressure to the shim and hence, to the pressure-sensitive adhesive.

BRIEF DESCRIPTION OF THE DRAWINGS

The drawings show the preferred embodiments of the invention by way of example only.

DETAILED DESCRIPTION OF THE PREFERRED EMBODIMENTS

The following descriptions describe the preferred embodiments of the invention by way of example only.

Figure 1:
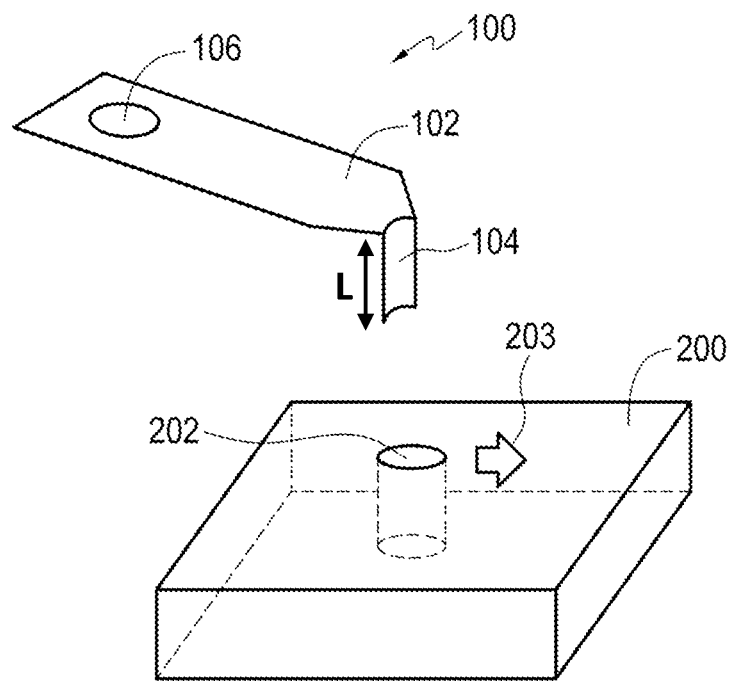
FIG. 1 shows a first preferred embodiment of a drill hole repositioning tool according to the invention.

FIG. 1 shows a first preferred embodiment of a drill hole repositioning tool 100 according to the invention. The tool 100 has an elongate handle 102 having a proximal end and a distal end, and an elongate drill bit guide 104 secured at a right angle to the distal end of the handle 100. The elongate drill bit guide 104 has a shape which is substantially the shape of a sector of a cylindrical wall. The elongate drill bit guide 104 has thus a convex side 103 and a concave side 105 as can be more clearly seen in the sectional view of FIG. 2. The convex side 103 and the concave side 105 each have an identical predetermined diameter D so that the cross-section of the elongate drill bit guide 104 has a crescent-like shape with the thickness at the ends of the crescent-like shape being smaller than the predetermined thickness T of the elongate drill bit guide 104 at the center of the crescent-like shape. FIG. 1 further shows a workpiece 200 defining an existing drill hole 202. The existing drill hole 202 is to be repositioned to the right as shown by arrow 203. The elongate drill bit guide 104 has a predetermined insertion length L for inserting in the existing drill hole 202.

Figure 2:
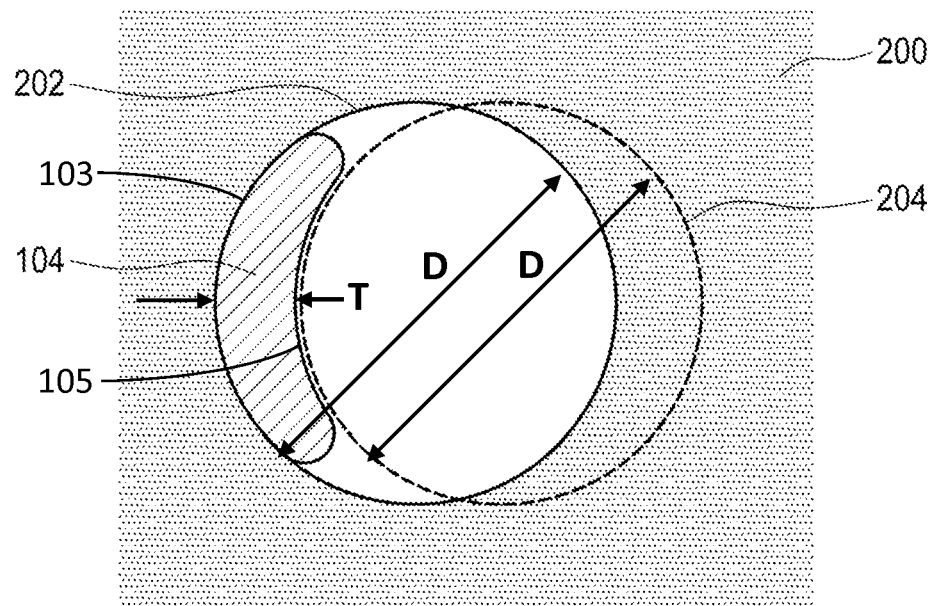
FIG. 2 shows a sectional view of the elongate drill bit guide in a drill hole to be repositioned.
Figure 3:
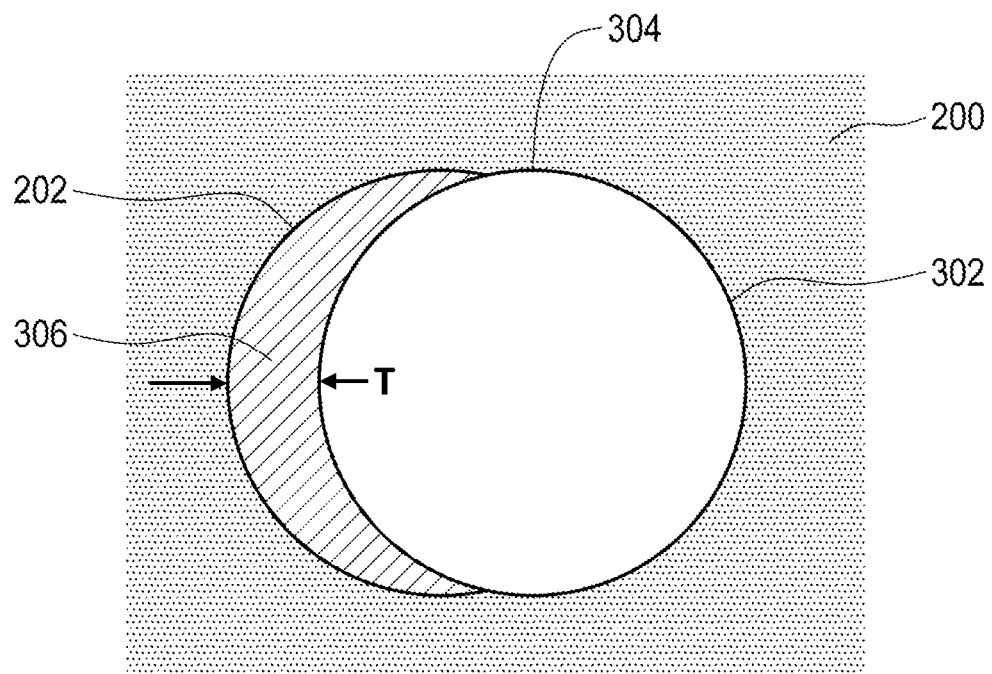
FIG. 3 shows a sectional view of the repositioned drill hole.

FIG. 2 shows a sectional view of the elongate drill bit guide 104 in the existing drill hole 202. The convex side 103 of the elongate drill bit guide 104 butts on the left hand side of the existing drill hole 202, which is on the opposite side of the direction in which the existing drill hole 202 is to be repositioned. The concave side 105 of the elongate drill bit guide 104 guides a drill 204 (shown in broken lines) for drilling a new drill hole 302 shown in FIG. 3. The new drill hole 302 is displaced from the existing drill hole 202 to the right by the predetermined thickness T. The overall resulting hole 304 is a combination of the existing drill hole 202 and the new drill hole 302. The cross-section of the overall resulting hole 304 has a figure-eight-like shape and may be shimmed with a full shim 306 or a partial shim (not shown) glued to the left hand side of the existing drill hole 202 with a pressure-sensitive adhesive so that the new drill hole 302 gets at least a portion of a cylindrical wall on its left hand side. The convex side 103 of the elongate drill bit guide 104 may be used to apply pressure to the shim 306 and hence, to the pressure-sensitive adhesive.

Preferably, the concave side 105 corresponds to a sector having a central angle of about 120°.

Preferably, the predetermined diameter D of the convex side 103 and the concave side 105 corresponds to the diameter of a standardized drill bit size.

Preferably, the predetermined thickness T ranges from about one-tenth of the predetermined diameter D to about one-half of the predetermined diameter D to cater for the corresponding range of drill hole repositioning displacements.

Preferably, the predetermined insertion length L ranges from about one-half of the predetermined diameter D to a common length of the corresponding standardized drill bit size to cater for a range of drill hole depths.

Figure 4:
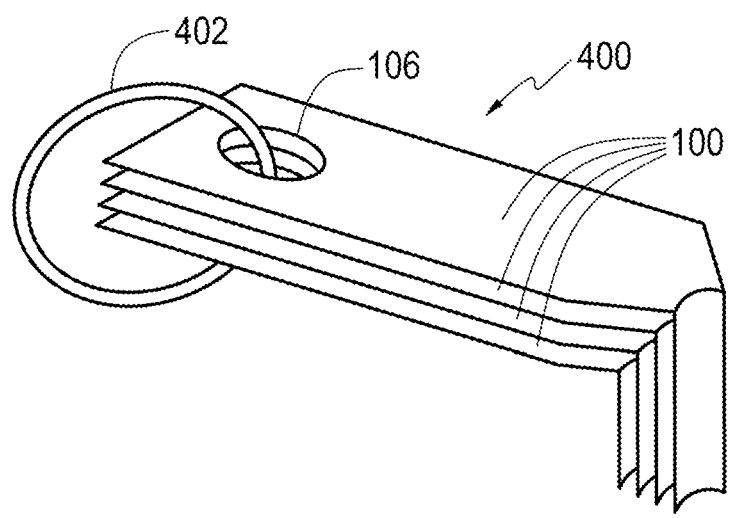
FIG. 4 shows a set of the drill hole repositioning tools of FIG. 1.

FIG. 4 shows a set 400 of drill hole repositioning tools 100, wherein each handle 102 of each drill hole repositioning tool 100 define an aperture 106 for holding the set 400 together with a ring 402. The elongate drill bit guides 104 of the drill hole repositioning tools 100 of the set 400 may have a range of predetermined diameters D, a range of predetermined thicknesses T, and a range of predetermined insertion lengths L.

Preferably, the drill hole repositioning tool 100 is made of carbon steel.

The workpiece 200 may be made of wood, glass, metal, or other drillable materials.

Figure 5:
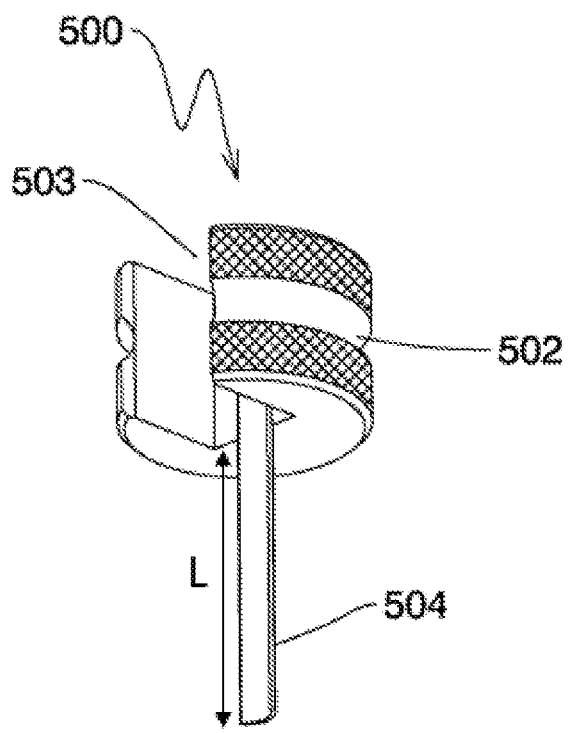
FIG. 5 shows a second preferred embodiment of a drill hole repositioning tool according to the invention.

FIG. 5 shows a second preferred embodiment of a drill hole repositioning tool 500 according to the invention. The drill hole repositioning tool 500 has a substantially cylindrical head 502 for holding the drill repositioning tool 500. The substantially cylindrical head 502 defines a cutout 503. An elongate drill bit guide 504 is secured in the cutout 503 in the axial direction of the substantially cylindrical head 502. The elongate drill bit guide 504 has identical characteristics as the elongate drill bit guide 104 and the details are therefore not repeated in this section.

Figure 6:
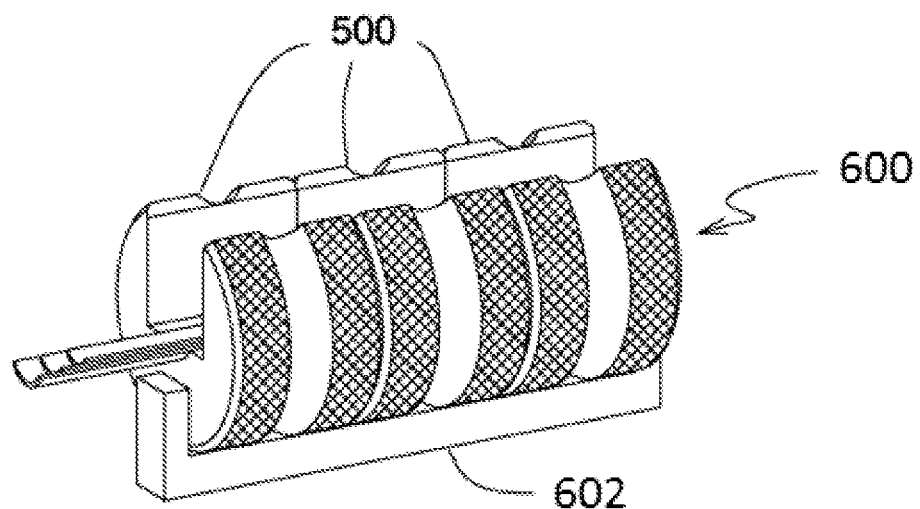
FIG. 6 shows a set of the drill hole repositioning tools of FIG. 5.

FIG. 6 shows a set 600 of drill hole repositioning tools 500. A bracket 602 releasably holds the heads 502 together and hence, releasably holds the set 600 together. The elongate drill bit guides 504 of the drill hole repositioning tools 500 of the set 600 may have a range of predetermined diameters D, a range of predetermined thicknesses T, and a range of predetermined insertion lengths L.

Preferably, the drill hole repositioning tool 500 is made of carbon steel.

A person skilled in the art will have by now appreciated the full scope of the invention. In particular, the scope of the invention is not limited to the preferred embodiments described by way of example in the above.

The invention claimed is:

1. A drill hole repositioning tool for facilitating a repositioning of an existing drill hole in a workpiece, the drill hole repositioning tool comprising:
  a handle member for holding the tool; and an elongate drill bit guide secured to the handle member;
  the elongate drill bit guide having a shape which is substantially the shape of a sector of a cylindrical wall, the elongate drill bit guide thus having a convex side and a concave side, the convex side and the concave side each having an identical predetermined diameter D so that the cross-section of the elongate drill bit guide has a crescent-like shape, the elongate drill bit guide having a predetermined thickness T at the center of the crescent-like shape;
  the elongate drill bit guide having a predetermined insertion length L for inserting in the existing drill hole wherein the convex side of the elongate drill bit guide butts on one side of the existing drill hole;
  the concave side of the elongate drill bit guide for guiding a drill bit, the drill bit for drilling a new drill hole in the workpiece so that the new drill hole is displaced from the existing drill hole by the predetermined thickness T;
  whereby the cross-section of the overall resulting hole in the workpiece has a figure-eight-like shape wherein the existing drill hole has been repositioned to the new drill hole from one part of the figure-eight-like shape to the other part of the figure-eight-like shape;
  wherein the handle member is a substantially cylindrical head defining a cutout, and the elongate drill bit guide is secured in the cutout in the axial direction of the substantially cylindrical head.

2. A drill hole repositioning tool as defined in claim 1, wherein the concave side corresponds to a sector having a central angle of about 120°.

3. A drill hole repositioning tool as defined in in claim 1, wherein the predetermined diameter D corresponds to the diameter of a standardized drill bit size.

4. A drill hole repositioning tool as defined in claim 1, wherein the predetermined thickness T ranges from about one-tenth of the predetermined diameter D to about one-half of the predetermined diameter D.

5. A drill hole repositioning tool as defined in claim 1, wherein the elongate drill bit guide has a predetermined insertion length L ranging from about one-half of the predetermined diameter D to a common length of the corresponding standardized drill bit size.

6. A set of drill hole repositioning tools, each tool in the set as defined in claim 1, further comprising a bracket for releasably holding the substantially cylindrical heads of the drill hole repositioning tools together and hence releasably holding the set of drill hole repositioning tools together.

7. A drill hole repositioning tool as defined in claim 1, made of carbon steel.

8. A set of drill hole repositioning tools, each tool in the set for facilitating a repositioning of an existing drill hole in a workpiece, the drill hole repositioning tool comprising:
  a handle member for holding the tool; and
  an elongate drill bit guide secured to the handle member;
  the elongate drill bit guide having a shape which is substantially the shape of a sector of a cylindrical wall, the elongate drill bit guide thus having a convex side and a concave side, the convex side and the concave side each having an identical predetermined diameter D so that the cross-section of the elongate drill bit guide has a crescent-like shape, the elongate drill bit guide having a predetermined thickness T at the center of the crescent-like shape;
  the elongate drill bit guide having a predetermined insertion length L for inserting in the existing drill hole wherein the convex side of the elongate drill bit guide butts on one side of the existing drill hole;
  the concave side of the elongate drill bit guide for guiding a drill bit, the drill bit for drilling a new drill hole in the workpiece so that the new drill hole is displaced from the existing drill hole by the predetermined thickness T;
  whereby the cross-section of the overall resulting hole in the workpiece has a figure-eight-like shape wherein the existing drill hole has been repositioned to the new drill hole from one part of the figure-eight-like shape to the other part of the figure-eight-like shape;
  wherein the handle member is an elongate handle having a proximal and a distal end, and the elongate drill bit guide is secured at a right angle to the distal end of the elongate handle; and wherein each elongate handle defines an aperture, and further comprising a ring through the apertures for holding the set of drill hole repositioning tools together.

9. A set of drill hole repositioning tools as defined in claim 8, wherein the concave side of each tool corresponds to a sector having a central angle of about 120°.

10. A set of drill hole repositioning tools as defined in claim 8, wherein the predetermined diameter D of each tool corresponds to the diameter of a standardized drill bit size.

11. A set of drill hole repositioning tools as defined in claim 8, wherein the predetermined thickness T of each tool ranges from about one-tenth of the predetermined diameter D to about one-half of the predetermined diameter D.

12. A set of drill hole repositioning tools as defined in claim 8, wherein the elongate drill bit guide of each tool has a predetermined insertion length L ranging from about one-half of the predetermined diameter D to a common length of the corresponding standardized drill bit size.

13. A set of drill hole repositioning tools as defined in claim 8, wherein each tool is made of carbon steel.

* * * * *